No. 664,515. Patented Dec. 25, 1900.
J. B. WARING.
REDUCING VALVE.
(Application filed Dec. 29, 1899.)
(No Model.) 2 Sheets—Sheet 1.
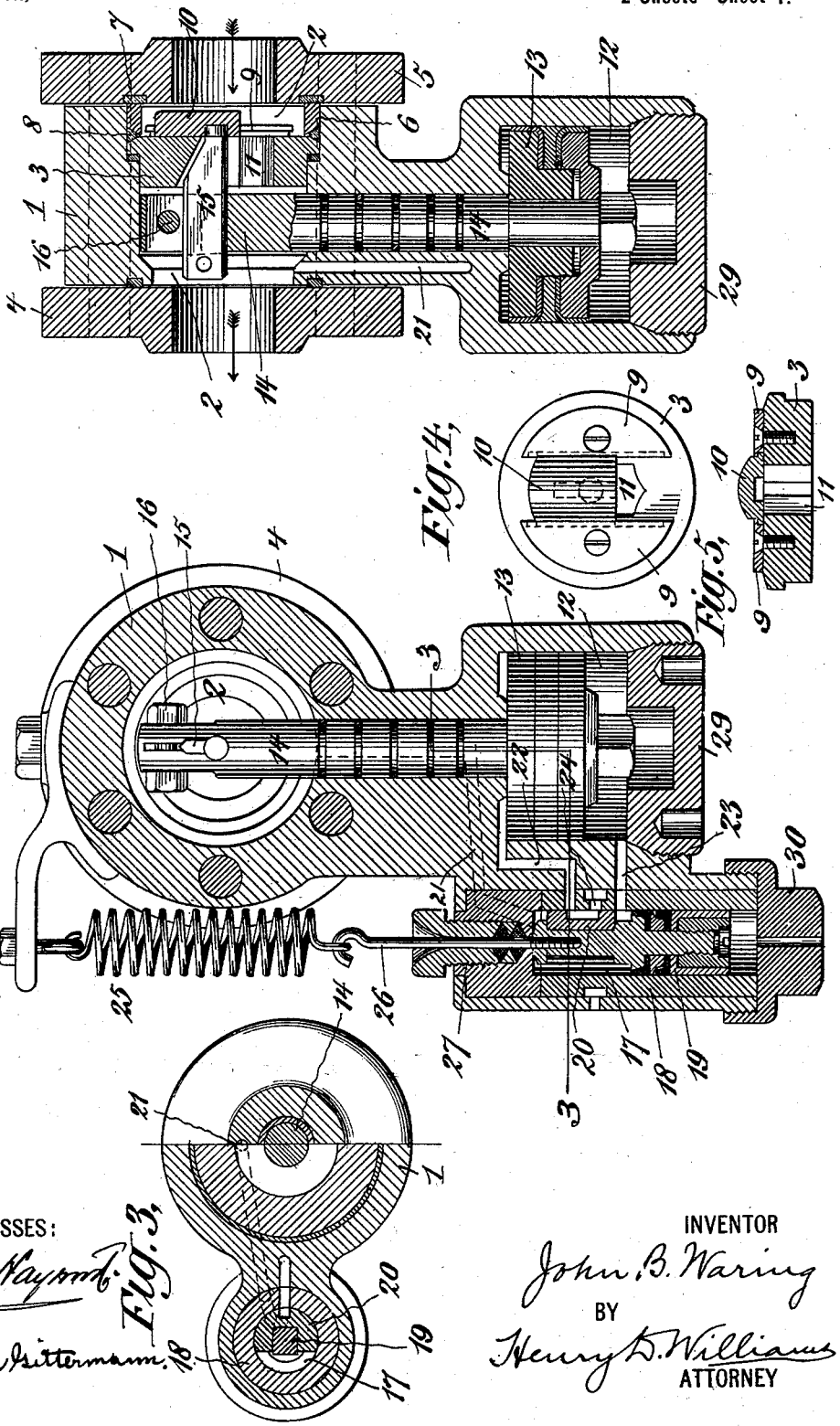
WITNESSES:
INVENTOR
John B. Waring
BY
Henry D. Williams
ATTORNEY

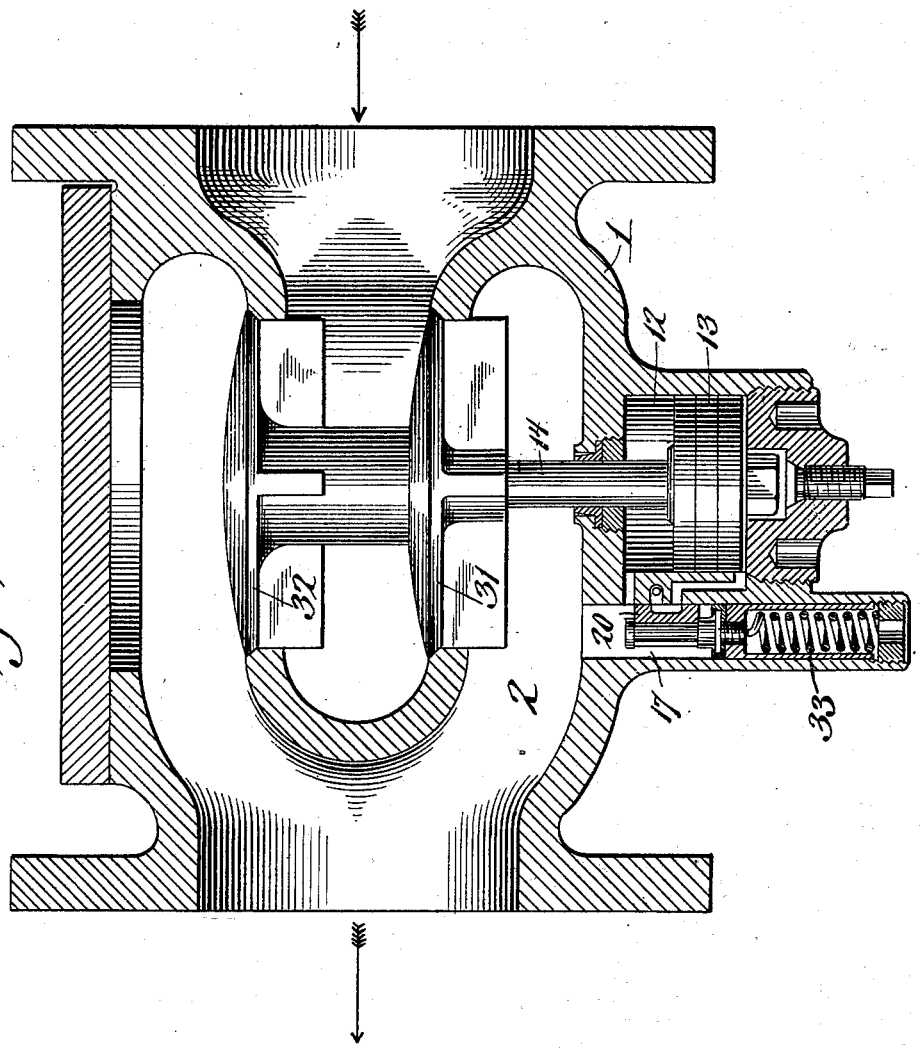

UNITED STATES PATENT OFFICE.

JOHN B. WARING, OF NEWARK, NEW JERSEY, ASSIGNOR OF ONE-HALF TO HUGH L. FOX, OF NEW YORK, N. Y.

REDUCING-VALVE.

SPECIFICATION forming part of Letters Patent No. 664,515, dated December 25, 1900.

Application filed December 29, 1899. Serial No. 741,977. (No model.)

*To all whom it may concern:*

Be it known that I, JOHN B. WARING, a citizen of the United States, and a resident of Newark, Essex county, State of New Jersey, have invented certain new and useful Improvements in Reducing-Valves, of which the following is a specification, reference being had to the accompanying drawings, forming part hereof.

My invention relates to reducing-valves adapted for controlling the flow of fluid under pressure, and is embodied in improved means of simple construction for such purpose, the means embodying my invention being particularly adapted for the reduction of extremely high pressures; and my invention has for its objects to minimize the strain on working parts, to minimize the wear and the effects of wear on the working faces of the valve and other parts, and generally to simplify and improve the construction and increase the effectiveness of devices of this description.

The accompanying drawings illustrate reducing-valves embodying my invention.

Figure 1 represents a central section, transversely of the direction of flow of the fluid, of such a reducing-valve. Fig. 2 represents a section taken at right angles to the plane of section in Fig. 1 and hence longitudinally of the direction of flow of the fluid. Fig. 3 is a horizontal section on the line 3 3 of Fig. 1. Figs. 4 and 5 are respectively a face view and a cross-section of the valve-seat and valve. Fig. 6 is a sectional view of a modified form of a reducing-valve embodying my invention.

The valve-casing 1 has at its upper end a chamber 2, comprising a plurality of cylindrical bores. A valve-seat 3, located therein, has an annular flange which engages with a shoulder between two of the said cylindrical bores, and between said annular flange and shoulder a suitable packing-ring is provided, as shown. Two flanged heads 4 and 5 are shown as provided at the front and rear face of the casing and secured to the casing by through-bolts, which bolts may also serve to secure the device itself to a line of piping or elsewhere, as may be desired. A tight joint may be effected between the casing and the head 5, and the valve-seat is secured in place and the joint between it and the casing kept tight by the provision of a spacing-ring 6 and two packing-rings 7 and 8. The packing-ring 7 is preferably of some comparatively hard material, such as Babbitt metal, while the packing-ring 8 is preferably of softer metal, such as lead. The opposing faces of the valve-seat 3 and the spacing-ring 6 are oppositely beveled and the packing-ring 8 arranged between them. Upon drawing or clamping the head 5 toward the casing 1 the softer metal of the packing-ring 8 will be caused to slightly "flow" and to be pressed outwardly, and a tight joint will be effected at this point between the valve-seat, the casing, and one end of the spacing-ring, while a slight further pressure will make the joint tight between the head and the opposite end of the spacing-ring. A suitable packing-ring is arranged, as shown, between the head 4 and the casing.

The valve-seat 3 is provided with flanged guides 9, and the slide-valve 10, having grooves fitted to said guides, is arranged to slide and be guided thereby upon said seat. A port 11 is formed in the valve-seat for the passage of the fluid under pressure. The front part of this port, or that part which is first uncovered by the opening movement of the valve, is preferably restricted, so that the initial opening is very small, and this port may be conveniently shaped, as shown in detail in Fig. 4.

The lower portion of the casing 1 has a cylindrical bore 12, which is shown as arranged at right angles to the valve-chamber 2. A piston-head 13 is fitted to the bore 12 and has a limited movement therein. A piston-rod 14 is secured to the piston 13 and extends upwardly therefrom and is fitted to slide in a cylindrical orifice extending from the cylindrical bore 12 into the valve-chamber 2. The upper end of the piston-rod is provided with a valve-actuating arm 15, securely clamped in position transversely thereof, and one end of this arm extends through the valve-seat 3 and engages the slide-valve 10. In this manner the piston 13, the piston-rod 14, the arm 15, and the valve 10 are all arranged to move together.

It is very essential that the arm 15 be secured to the piston-rod 14 in such a manner that it shall not slip. I have found a convenient and effective construction to be as illustrated, in which the arm 15 is in the form of a flat pin and arranged in a corresponding slot in the piston-rod. The front edges of this pin are beveled and arranged to engage with beveled shouldered portions of the said slot. A clamping-bolt 16 is provided, and upon tightening the nut on the clamping-bolt the arm will not only be clamped between the side faces of the slot, but by reason of the beveled faces aforesaid will be crowded up to the rear end of the slot, and thus held very securely in position. The end of the arm engaging the valve is preferably enlarged diametrically and made cylindrical in form in order to engage with a cylindrical recess in the valve. The slot in the piston-rod may be enlarged to this same size opposite this point in order that the arm may be inserted and removed, when desired, through the said slot.

The casing 1 has a second cylindrical bore 17, which may be arranged parallel to the said bore 12. For convenience of construction and manufacture the said bore 17 is shown as formed in a bushing 18, such bushing being made in two pieces and fitting a larger bore in the casing. A piston 19 is fitted to the bore 17 and has a limited movement therein, and a D slide-valve 20 is arranged within the upper portion of the bore 17 and is secured to or engages the piston 19. A duct or passage 21 extends from the low-pressure side (the left-hand side in Fig. 2) of the main valve and extends down through the casing and through the bushing 18 and into the upper chamber in said bushing, and thus maintains this upper chamber of the bushing 18 in open communication with the low-pressure side of the chamber 2. The direction of flow of the fluid through the chamber 2 is as shown in the direction of the arrows in Fig. 2.

Passages are formed between the valve-chamber end of the bore 17 and the bore 12, the passage 22 extending from above the piston 13 and the passage 23 extending from below the piston 13, and these passages have ports at their ends which are the induction-ports for said piston, and an exhaust-passage and valve-port 24 lead through an annular opening about the bushing 18 to the atmosphere. The valve 20 in its movements controls the ports 22, 23, and 24 and admits and exhausts fluid under pressure to and from opposite sides of the piston 12, according to its position. A resistance device is arranged to hold the piston 19 upward against normal pressure on the low-pressure side of the main valve, but to yield to a slight increase of pressure, such resistance device being shown as a tension-spring, which is arranged between a fixed support upon the casing and a rod 26, secured to the piston 19 and passing through a suitable stuffing-box 27. The tension of the spring 26 is preferably and is here shown as adjustable, and means for such adjustment are provided in the threaded rod and nut 28.

The lower ends of the cylindrical bores 12 and 17 are shown as closed by covers or heads 29 and 30, respectively.

In the operation of the device fluid under high pressure—such, for instance, as air at three thousand pounds per square inch—is admitted to the chamber 2 at the high-pressure side of the valve, (the right-hand side, as shown in Fig. 2.) If the valve 10 be open, as shown, the compressed fluid will pass through the passage 11 into the low-pressure side of the chamber 2 and will pass away through the head 4 to any desired point. In so passing the fluid under pressure will pass through the passage 21 into the valve-chamber end of the bore 17 and will press upon the piston-head 19. When the pressure reaches such a point as to overcome the resistance of the spring 25—say a pressure of three hundred pounds—the piston 19 will be forced downwardly and the position of the D-valve 20 reversed. Fluid under pressure will now be admitted to the upper side of the piston 13 through the passage and port 22 and exhausted from the lower side through the passages and ports 23 and 24. This will force the said piston 13 downwardly, and the piston 13 will carry the valve 10 with it and will close the port 11. The valve 10 will remain closed until the pressure on the low-pressure side in the chamber 2, and hence the pressure in the upper end of the chamber 17, falls below the predetermined pressure, here assumed to be three hundred pounds, and the spring 25 returns the valve 20 toward the position shown in the drawings. Then the piston 13 will be again forced upwardly and the valve 11 opened. By the above arrangement and construction of parts I have produced a reducing-valve which is adapted for use with extremely high pressures, and yet one which is simple and effective in its action and composed of but few parts. One of the great difficulties in handling such high pressures is to so construct the valve and seat that the fluid in rushing past at such high speed shall not so wear away the said seat as to render it useless in a short time. By arranging a valve to move transversely of the flow of the fluid through the valve-seat I have devised a construction by which the wearing away of the edge of the valve or the seat within wide limits will not affect the operation of the same. I have also so constructed and arranged the parts that both valve and seat may be easily removed and replaced when desired.

In Fig. 6 I have shown a construction adapted for use with lower pressures, such as the reduction of steam from two or three hundred pounds to the square inch down to the desired point. In such construction I have shown balanced valves 31 and 32 on one stem, which are operated by a piston corresponding to the piston 13 in the construction above described. A similar governor and controlling means are shown, except that a compression-spring 33 is substituted for the tension-spring 25. This permits the end of the cylindrical bore in which is mounted the controlling-valve and piston to be directly opened into the low-pressure side of the chamber 2. Such construction embodies the main principles of my invention and is a very simple and effective device for operating in conjunction with comparatively low pressures.

It is evident that various modifications and structural changes may be made in the construction shown and above particularly described within the purview of my invention.

What I claim, and desire to secure by Letters Patent, is—

1. A reducing-valve comprising a casing having a high-pressure chamber and a low-pressure chamber and a valve-seat, a valve constructed to work against the valve-seat and controlling the flow of fluid from the high-pressure chamber to the low-pressure chamber, means for operating said valve actuated by pressure from the low-pressure side of said valve and connected to said valve through an opening in the valve-seat, and a governing device operated under variations of pressure on the low-pressure side of said valve and controlling the admission of fluid under pressure from the low-pressure side of said valve to said valve-operating means and the exhaustion of fluid therefrom, substantially as set forth.

2. In a reducing-valve, in combination, a casing having two chambers and a partition separating said chambers comprising a valve-seat having the valve-port 11 therein, such valve-port having a restricted front portion, the slide-valve 10 guided on the valve-seat and controlling the flow of fluid through such port, the rod 14 and pressure-actuated means for actuating the same, the arm 15 and means for clamping the same in the rod 14, the slide-valve 10 having a recess in its face and the arm 15 extending through the valve-port and entering the recess in the face of the valve, substantially as set forth.

3. A reducing-valve comprising a casing having a high-pressure chamber and a low-pressure chamber and a valve-seat, a slide-valve located so as to be pressed against the valve-seat from the high-pressure chamber, a pressure-actuated device and a governing device, and a valve operated by the governing device and adapted in its movement to admit fluid under pressure from the low-pressure side of the valve to opposite sides of said pressure-actuated device, and to exhaust fluid from opposite sides of said pressure-actuated device, said pressure-actuated device including a rod in the low-pressure chamber and a valve-actuating arm extending therefrom and extending through an opening in the valve-seat and engaging the slide-valve, substantially as set forth.

4. In a reducing-valve, in combination, a casing having a high-pressure chamber and a low-pressure chamber and a partition separating said chambers comprising a valve-seat having a valve-port 11 therein, such valve-port having a restricted front portion, the slide-valve 10 guided on the valve-seat and controlling the flow of fluid through such port, a pressure-actuated device and a governing device, a valve operated by the governing device and adapted in its movement to admit fluid under pressure from the low-pressure side of the valve to opposite sides of said pressure-actuated device and to exhaust fluid from opposite sides of said pressure-actuated device, said pressure-actuated device including the rod 14, the arm 15 and means for clamping the same in the rod 14, the slide-valve 10 having a recess in its face and the arm 15 extending through the valve-port and entering the recess in the face of the valve, substantially as set forth.

Signed in the borough of Manhattan and city of New York, State of New York, this 27th day of December, 1899.

JOHN B. WARING.

Witnesses:
HENRY D. WILLIAMS,
HERBERT H. GIBBS.